(12) United States Patent
Hayes

(10) Patent No.: US 7,857,905 B2
(45) Date of Patent: Dec. 28, 2010

(54) FLEXIBLE THERMAL CURE SILICONE HARDCOATS

(75) Inventor: Robert F. Hayes, Ballston Lake, NY (US)

(73) Assignee: Momentive Performance Materials Inc., Albany, NY (US)

( * ) Notice: Subject to any disclaimer, the term of this patent is extended or adjusted under 35 U.S.C. 154(b) by 913 days.

(21) Appl. No.: 11/713,888

(22) Filed: Mar. 5, 2007

(65) Prior Publication Data

US 2008/0217577 A1    Sep. 11, 2008

(51) Int. Cl.
    C04B 41/68    (2006.01)
    C08G 77/02    (2006.01)
    B32B 9/04    (2006.01)

(52) U.S. Cl. .................. 106/287.1; 528/34; 428/446; 428/447

(58) Field of Classification Search ............... 106/287.1
    See application file for complete search history.

(56) References Cited

U.S. PATENT DOCUMENTS

| | | |
|---|---|---|
| 3,976,497 A | 8/1976 | Clark |
| 3,986,997 A | 10/1976 | Clark |
| 4,027,073 A | 5/1977 | Clark |
| 4,106,948 A | 8/1978 | Cooper et al. |
| 4,159,206 A | 6/1979 | Armbruster et al. |
| 4,170,690 A | 10/1979 | Armbruster et al. |
| 4,173,490 A | 11/1979 | Rotenberg et al. |
| 4,177,175 A | 12/1979 | Baney et al. |
| 4,177,315 A | 12/1979 | Ubersax |
| 4,188,451 A | 2/1980 | Humphrey, Jr. |
| 4,191,804 A | 3/1980 | Weber |
| 4,197,230 A | 4/1980 | Baney et al. |
| 4,197,335 A | 4/1980 | Goossens |
| 4,210,699 A | 7/1980 | Schroeter et al. |
| 4,211,823 A | 7/1980 | Suzuki et al. |
| 4,218,508 A | 8/1980 | Humphrey, Jr. |
| 4,223,072 A | 9/1980 | Baney et al. |
| 4,224,378 A | 9/1980 | Schroeter et al. |
| 4,232,088 A | 11/1980 | Humphrey, Jr. |
| 4,235,954 A | 11/1980 | Humphrey, Jr. |
| 4,239,668 A | 12/1980 | Clark et al. |
| 4,239,798 A | 12/1980 | Schroeter et al. |
| 4,242,381 A | 12/1980 | Goossens et al. |
| 4,242,383 A | 12/1980 | Goossens et al. |
| 4,243,720 A | 1/1981 | Schroeter et al. |
| 4,243,721 A | 1/1981 | Baney et al. |
| 4,243,722 A | 1/1981 | Haluska |
| 4,275,118 A | 6/1981 | Baney et al. |
| 4,277,287 A | 7/1981 | Frye |
| 4,277,525 A | 7/1981 | Nakayama et al. |
| 4,284,685 A | 8/1981 | Olson et al. |
| 4,298,632 A | 11/1981 | Schroeter et al. |
| 4,298,655 A | 11/1981 | Kray |
| 4,299,886 A | 11/1981 | Soejima et al. |
| 4,308,315 A | 12/1981 | Frye |
| 4,308,317 A | 12/1981 | Olson et al. |
| 4,309,319 A | 1/1982 | Vaughn, Jr. |
| 4,310,600 A | 1/1982 | Cross |
| 4,311,738 A | 1/1982 | Chi |
| 4,311,763 A | 1/1982 | Conroy |
| 4,313,979 A | 2/1982 | Frye et al. |
| 4,315,046 A | 2/1982 | Frye |
| 4,324,712 A | 4/1982 | Vaughn, Jr. |
| 4,324,839 A | 4/1982 | Frye |
| 4,330,446 A | 5/1982 | Miyosawa |
| 4,348,431 A | 9/1982 | O'Malley |
| 4,348,462 A | 9/1982 | Chung |
| 4,353,959 A | 10/1982 | Olson et al. |
| 4,355,135 A | 10/1982 | January |
| 4,367,262 A | 1/1983 | Vaughn, Jr. |
| 4,368,235 A | 1/1983 | Vaughn, Jr. |
| 4,378,250 A | 3/1983 | Treadway et al. |
| 4,379,196 A | 4/1983 | Halper |
| 4,390,373 A | 6/1983 | White et al. |
| 4,394,177 A | 7/1983 | Fujioka et al. |
| 4,395,463 A | 7/1983 | Kray |
| 4,401,718 A | 8/1983 | Medford |
| 4,405,679 A | 9/1983 | Fujioka et al. |
| 4,407,920 A | 10/1983 | Lee et al. |
| 4,413,088 A | 11/1983 | Frye |
| 4,417,790 A | 11/1983 | Dawson et al. |
| 4,421,893 A | 12/1983 | Haluska et al. |
| 4,435,219 A | 3/1984 | Greigger |
| 4,435,476 A | 3/1984 | Phillips et al. |
| 4,436,851 A | 3/1984 | Vaughn, Jr. |
| 4,436,924 A | 3/1984 | Ashby et al. |
| 4,439,239 A | 3/1984 | Greigger et al. |
| 4,439,509 A | 3/1984 | Schank |
| 4,442,168 A | 4/1984 | White et al. |

(Continued)

FOREIGN PATENT DOCUMENTS

EP    0 576 166 A2    12/1993

(Continued)

Primary Examiner—Randy Gulakowski
Assistant Examiner—Robert Loewe
(74) Attorney, Agent, or Firm—Dominick G. Vicari; Joseph S. Ostoff

(57) ABSTRACT

The present invention relates to thermal cure silicone hardcoat compositions that are prepared with an aqueous/organic solvent silicone dispersion, partial organoalkoxysilane condensate and silylating agent. The novel heat curable silicone hardcoats are useful on various substrates with improved flexibility.

37 Claims, No Drawings

U.S. PATENT DOCUMENTS

| | | |
|---|---|---|
| 4,443,579 A | 4/1984 | Doin et al. |
| 4,450,255 A | 5/1984 | Baney |
| 4,451,603 A | 5/1984 | Sekmakas et al. |
| 4,469,743 A | 9/1984 | Hiss |
| 4,472,464 A | 9/1984 | Haluska et al. |
| 4,472,510 A | 9/1984 | January |
| 4,474,857 A | 10/1984 | Vaughn et al. |
| 4,476,281 A | 10/1984 | Vaughn, Jr. |
| 4,477,499 A | 10/1984 | Doin et al. |
| 4,477,519 A | 10/1984 | Frye |
| 4,477,528 A | 10/1984 | Frye |
| 4,478,873 A | 10/1984 | Masso et al. |
| 4,486,503 A | 12/1984 | Vaughn, Jr. |
| 4,492,733 A | 1/1985 | Phillips et al. |
| 4,495,360 A | 1/1985 | Anthony |
| 4,499,224 A | 2/1985 | Anthony et al. |
| 4,500,669 A | 2/1985 | Ashlock et al. |
| 4,503,126 A | 3/1985 | Phillips et al. |
| 4,525,426 A | 6/1985 | Anthony |
| 4,539,351 A | 9/1985 | O'Malley et al. |
| 4,540,634 A | 9/1985 | Ashlock et al. |
| RE32,107 E | 4/1986 | January |
| 4,584,340 A | 4/1986 | Chi |
| 4,632,527 A | 12/1986 | Masso et al. |
| 4,673,354 A | 6/1987 | Culler |
| 4,687,707 A | 8/1987 | Matsuo et al. |
| 4,702,773 A | 10/1987 | Ashlock et al. |
| 4,731,264 A | 3/1988 | Lin et al. |
| 4,738,899 A | 4/1988 | Bluestein et al. |
| 4,746,693 A | 5/1988 | Meder |
| 4,753,827 A | 6/1988 | Yoldas et al. |
| 4,783,347 A | 11/1988 | Doin et al. |
| 4,791,230 A | 12/1988 | Lin et al. |
| 4,799,963 A | 1/1989 | Basil et al. |
| 4,814,017 A | 3/1989 | Yoldas et al. |
| 4,863,520 A | 9/1989 | Factor et al. |
| 4,895,887 A | 1/1990 | Daimon et al. |
| 4,914,143 A | 4/1990 | Patel |
| 4,942,065 A | 7/1990 | Factor et al. |
| 4,978,702 A | 12/1990 | Yuyama et al. |
| 4,990,376 A | 2/1991 | Patel |
| 5,021,091 A | 6/1991 | Takarada et al. |
| 5,025,049 A | 6/1991 | Takarada et al. |
| 5,026,606 A | 6/1991 | Isbrandt et al. |
| 5,026,813 A | 6/1991 | Meder |
| 5,102,967 A | 4/1992 | Meder |
| 5,115,023 A | 5/1992 | Basil et al. |
| 5,232,964 A | 8/1993 | Evans et al. |
| 5,342,658 A | 8/1994 | Hong et al. |
| 5,349,002 A | 9/1994 | Patel |
| 5,352,532 A | 10/1994 | Kline |
| 5,368,941 A | 11/1994 | Blizzard et al. |
| 5,387,480 A | 2/1995 | Haluska et al. |
| 5,391,795 A | 2/1995 | Pickett |
| 5,401,579 A | 3/1995 | Basil et al. |
| 5,403,535 A | 4/1995 | Blizzard et al. |
| 5,411,807 A | 5/1995 | Patel et al. |
| 5,415,942 A | 5/1995 | Anderson |
| 5,492,958 A | 2/1996 | Haluska et al. |
| 5,503,935 A | 4/1996 | Patel |
| 5,541,248 A | 7/1996 | Haluska et al. |
| 5,567,859 A | 10/1996 | Emanuele et al. |
| 5,571,365 A | 11/1996 | Maehata et al. |
| 5,618,619 A | 4/1997 | Petrmichl et al. |
| 5,624,757 A | 4/1997 | Smith |
| 5,648,173 A | 7/1997 | Blizzard |
| 5,665,814 A | 9/1997 | Lewis et al. |
| 5,679,413 A | 10/1997 | Petrmichl et al. |
| 5,679,820 A | 10/1997 | Pickett et al. |
| 5,693,442 A | 12/1997 | Weiss et al. |
| 5,709,975 A | 1/1998 | Yoerger et al. |
| 5,716,679 A | 2/1998 | Krug et al. |
| 5,723,175 A | 3/1998 | Scholz et al. |
| 5,723,937 A | 3/1998 | Whitman et al. |
| 5,728,758 A | 3/1998 | Smith |
| 5,730,792 A | 3/1998 | Camilletti et al. |
| 5,731,117 A | 3/1998 | Ferrar et al. |
| 5,753,373 A | 5/1998 | Scholz et al. |
| 5,776,235 A | 7/1998 | Camilletti et al. |
| 5,778,295 A | 7/1998 | Chen et al. |
| 5,786,032 A | 7/1998 | Hughs |
| 5,817,183 A | 10/1998 | Eddy-Helenek et al. |
| 5,863,595 A | 1/1999 | Camilletti et al. |
| 5,869,185 A | 2/1999 | Bahr et al. |
| 5,873,931 A | 2/1999 | Scholz et al. |
| 5,874,018 A | 2/1999 | Ferrar et al. |
| 5,905,108 A | 5/1999 | Kushibiki et al. |
| 5,910,386 A | 6/1999 | Yoshinaga et al. |
| 5,929,159 A | 7/1999 | Schutt et al. |
| 5,939,194 A | 8/1999 | Hashimoto et al. |
| 5,958,514 A | 9/1999 | Havey et al. |
| 5,959,012 A | 9/1999 | Simonian et al. |
| 5,981,073 A | 11/1999 | Pickett et al. |
| 5,989,767 A | 11/1999 | Yoerger et al. |
| 5,990,984 A | 11/1999 | Meredith, Jr. et al. |
| 5,993,532 A | 11/1999 | Broderick et al. |
| 5,997,621 A | 12/1999 | Scholz et al. |
| 6,001,163 A | 12/1999 | Havey et al. |
| 6,001,522 A | 12/1999 | Woo et al. |
| 6,013,372 A | 1/2000 | Hayakawa et al. |
| 6,040,053 A | 3/2000 | Scholz et al. |
| 6,090,489 A | 7/2000 | Hayakawa et al. |
| 6,093,676 A | 7/2000 | Heller et al. |
| 6,099,971 A | 8/2000 | Faris et al. |
| 6,149,979 A | 11/2000 | Kushibiki et al. |
| 6,165,256 A | 12/2000 | Hayakawa et al. |
| 6,180,248 B1 | 1/2001 | Basil et al. |
| 6,194,029 B1 | 2/2001 | Aoi |
| 6,225,434 B1 | 5/2001 | Sadvary et al. |
| 6,250,760 B1 | 6/2001 | Treadway |
| 6,264,859 B1 | 7/2001 | Basil et al. |
| 6,265,029 B1 | 7/2001 | Lewis |
| 6,268,060 B1 | 7/2001 | Mokerji |
| 6,319,854 B1 | 11/2001 | Aoi |
| 6,331,206 B1 | 12/2001 | Wielstra et al. |
| 6,337,129 B1 | 1/2002 | Watanabe et al. |
| 6,346,331 B2 | 2/2002 | Havey et al. |
| 6,348,269 B1 | 2/2002 | Terry |
| 6,355,189 B1 | 3/2002 | Basil et al. |
| 6,376,064 B1 | 4/2002 | Gasworth et al. |
| 6,376,082 B1 | 4/2002 | Edmond et al. |
| 6,387,519 B1 | 5/2002 | Anderson et al. |
| 6,399,211 B2 | 6/2002 | Lewis |
| 6,451,420 B1 | 9/2002 | Jin et al. |
| 6,468,587 B2 | 10/2002 | Chang et al. |
| 6,469,119 B2 | 10/2002 | Basil et al. |
| 6,472,467 B1 | 10/2002 | Chiao |
| 6,489,393 B1 | 12/2002 | Sitabkhan et al. |
| 6,497,964 B1 | 12/2002 | Matsumura et al. |
| 6,524,664 B1 | 2/2003 | Hashimoto et al. |
| 6,534,188 B2 | 3/2003 | Sadvary et al. |
| 6,541,119 B2 | 4/2003 | Sadvary et al. |
| 6,586,502 B2 | 7/2003 | Wallace et al. |
| 6,593,417 B1 | 7/2003 | Anderson et al. |
| 6,607,590 B2 | 8/2003 | Jin et al. |
| 6,610,777 B1 | 8/2003 | Anderson et al. |
| 6,623,791 B2 | 9/2003 | Sadvary et al. |
| 6,635,341 B1 | 10/2003 | Barancyk et al. |
| 6,657,001 B1 | 12/2003 | Anderson et al. |
| 6,680,125 B1 | 1/2004 | Sasaki |
| 6,759,478 B2 | 7/2004 | Anderson et al. |
| 6,803,408 B2 | 10/2004 | Anderson et al. |
| 6,830,785 B1 | 12/2004 | Hayakawa et al. |
| 6,846,567 B1 | 1/2005 | Ekinaka et al. |

| | | |
|---|---|---|
| 6,855,415 B2 | 2/2005 | Lilly |
| 6,890,987 B2 | 5/2005 | Arora et al. |
| 6,987,144 B2 | 1/2006 | Anderson et al. |
| 7,005,472 B2 | 2/2006 | Anderson et al. |
| 7,053,149 B2 | 5/2006 | Anderson et al. |
| 7,265,234 B2 * | 9/2007 | Hamada et al. .............. 556/466 |
| 2002/0060848 A1 * | 5/2002 | Mitsuishi et al. ............. 359/586 |
| 2004/0102529 A1 * | 5/2004 | Campbell et al. .............. 516/79 |
| 2006/0046071 A1 * | 3/2006 | Richter et al. ................ 428/432 |
| 2006/0251848 A1 * | 11/2006 | Armstrong et al. .......... 428/64.4 |
| 2006/0251901 A1 * | 11/2006 | Armstrong et al. ........... 428/413 |
| 2006/0251906 A1 * | 11/2006 | Liao et al. .................... 428/446 |
| 2008/0069753 A1 * | 3/2008 | Floess et al. ................. 423/335 |

FOREIGN PATENT DOCUMENTS

| | | |
|---|---|---|
| EP | 0 748 259 B1 | 12/1996 |
| WO | WO 02/02672 | 1/2002 |
| WO | WO2007/030287 | 3/2007 |

* cited by examiner

US 7,857,905 B2

FLEXIBLE THERMAL CURE SILICONE HARDCOATS

FIELD OF THE INVENTION

The present invention relates generally to protective coatings for plastic articles, more particularly, to a flexible heat curable silicone hardcoat composition comprising aqueous/organic solvent silicone dispersion and silylating agent. Other embodiments of the present invention are directed to a process for making flexible silicone hardcoat compositions.

BACKGROUND OF THE INVENTION

Commercially available hardcoat coatings possessing physical and chemical properties that are useful in a wide variety of applications are well known in the art. For purposes of the present specification, a hardcoat (a.k.a., hard coating) will refer to a coating that exhibits good mechanical properties, such as, flexibility, scratch-resistance and abrasion-resistance.

Conventional thermal cure silicone hardcoats are often too stiff and/or brittle to be flexed or bent beyond a 1.8 percent "strain" with out fracturing, i.e., cracking or delaminating from a substrate. This limitation has restricted the use of silicone hardcoat materials to applications were the substrate is rigid enough to keep deformation, at the surface, to less than 1.8 percent strain. As a result of this constraint, the use of thermal cure silicone hardcoats is precluded from flexible plastic films and polyethylene terephthalate (PET) films in particular, due to the tendency of the coating to fracture when the plastic film is flexed during handling.

Typically, harder more highly crosslinked hardcoats exhibit improved scratch resistance, however, they are less flexible and much more susceptible to chipping or thermomechanical cracking due to embrittlement of the film resulting from a high crosslink density. Conversely, softer, less crosslinked hardcoat, while not as prone to chipping or thermomechanical cracking, is susceptible to scratching, waterspotting, and acid etch due to a low crosslink density of the cured film.

Additionally, thermally cured silicone hardcoats are treated with other materials, e.g., UV absorbing materials to prevent degradation of the underlying polymer substrate from exposure to ultraviolet (UV) light, which effects the adhesion of the coating to the substrate and the mechanical and optical properties of the substrate.

It is therefore an object of the present invention to provide a thermally cured silicone hardcoat composition having a high level of flexibility, abrasion resistance and, in general, improved resistance to cracking under exposure to thermal and/or mechanical stresses.

SUMMARY OF THE INVENTION

The present invention provides a heat curable silicone hardcoat composition comprising:
  a) an aqueous/organic solvent silicone dispersion containing colloidal silica and a partial condensate of at least one organoalkoxysilane said dispersion possessing a $T^3:T^2$ ratio from about 0.4 to about 1.3; and
  b) at least one silylating agent.

The present invention further provides a process for making a heat curable silicone hardcoat composition comprising:
  a) preparing an aqueous/organic solvent silicone dispersion containing colloidal silica and a partial condensate of at least one organoalkoxysilane, wherein the dispersion possesses a $T^3:T^2$ ratio from about 0.4 to about 1.3;
  b) adding at least one silylating agent; and, optionally,
  c) cooling the aqueous/organic solvent silicone dispersion prior to adding the silylating agent to provide a heat curable silicone hardcoat composition.

Mechanical stresses due to the difference in coefficient of thermal expansion (CTE) between coatings and substrates are a significant source of cracking in coated materials. However, the cured silicone hardcoat composition of the present invention possesses short production time, improved elongation, improved resistance to cracking under exposure to mechanical and thermomechanical stresses.

DETAILED DESCRIPTION OF THE INVENTION

The phrase "aqueous/organic solvent silicone dispersion" is understood herein to be a dispersion containing colloidal silica and the partial condensate of at least one organoalkoxysilane as defined in more detail hereinafter. After the addition of a silylating agent to the aqueous/organic solvent silicone dispersion the resulting silicone hardcoat compositions can be applied directly onto a variety of substrates, e.g., polyethyleneterephthalate (PET) and polycarbonate (PC) substrates, followed by a thermal cure to provide silicone hardcoat composites exhibiting improved flexibility, adhesion, resistance to cracking, abrasion resistance, and weathering protection.

Aqueous/organic solvent silicone dispersions are known in the art. Generally, these compositions have a dispersion of colloidal silica in an aliphatic alcohol/water solution of the partial condensate of an alkyltrialkyoxysilane, which can be methyltrimethoxysilane. Aqueous colloidal silica dispersions generally have a particle size in the range of 5 to 150 millimicrons in diameter. These silica dispersions are prepared by methods well-known in the art and are commercially available. Depending upon the percent solids desired in the final coating composition, additional alcohol, water, or a water-miscible solvent can be added. Generally, the solvent system should contain from about 20 to about 75 weight percent alcohol to ensure solubility of the siloxanol formed by the condensation of the silanol. If desired, a minor amount of an additional water-miscible polar solvent such as acetone, butyl cellosolve, and the like can be added to the water-alcohol solvent system. The composition is allowed to age for a short period of time to ensure formation of the partial condensate of the silanol, i.e., the siloxanol. Examples of aqueous/organic solvent silicone dispersions can be found in U.S. Pat. No. 3,986,997 to Clark which describes acidic dispersions of colloidal silica and hydroxylated silsesquioxane in an alcohol-water medium with a pH of about 3-6. Also, U.S. Pat. No. 4,177,315 to Ubersax discloses a coating composition comprising from about 5 to 50 weight percent solids comprising from about 10 to 70 weight percent silica and about 90 to 30 weight percent of a partially polymerized organic silanol of the general formula $RSi(OH)_3$, wherein R is selected from methyl and up to about 40% of a radical selected from the group consisting of vinyl, phenyl, gamma-glycidoxypropyl, and gamma-methacryloxypropyl, and about from 95 to 50 weight percent solvent, the solvent comprising about from 10 to 90 weight percent water and about from 90 to 10 weight percent lower aliphatic alcohol, the coating composition having a pH of greater than about 6.2 and less than about 6.5. U.S. Pat. No. 4,476,281 to Vaughn describes hard coat compositions having a pH from 7.1-7.8. In another example, U.S. Pat. No. 4,239,798 to Olson et al. discloses a thermoset, silica-filled, organopolysiloxane top coat, which is the condensation product of a silanol of the formula $RSi(OH)_3$ in which R is selected from the group consisting of alkyl radicals of 1 to 3 carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$. The content of the forgoing patents are herein incorporated by reference.

The colloidal silica dispersions of the present invention can contain partial condensates of both organotrialkoxysilanes and diorganodialkoxysilanes, as more fully described herein below; and can be prepared with suitable organic solvents, such as, for example, 1 to 4 carbon alkanol, such as methanol, ethanol, propanol, isopropanol, butanol; glycols and glycol ethers, such as propyleneglycolmethyl ether and the like and mixtures thereof.

Critical to the understanding of the heat curable silicone hardcoat composition of the present invention is the $T^3:T^2$ ratio of the aqueous/organic solvent silicone dispersion. The $T^3:T^2$ ratio is understood herein to mean the relationship of the amount of tri-condensed, tri-functional silane, i.e. $T^3$, to the amount of di-condensed, trifunctional silane, i.e., $T^2$, in the dispersion. The $T^3$ species is a silicon atom that is covalently bonded to one carbon atom and three oxysilyl groups, i.e. $C—Si(OSi)_3$. The $T^2$ species is a silicon atom that is covalently bonded to one carbon atom, two oxysilyl groups and one hydroxyl or oxycarbyl group, i.e. $C—Si(OSi)_2OH$ or $C—Si(OSi)_2(OC)$. The $T^3:T^2$ ratio is most conveniently measured by using $Si^{29}$ NMR to measure the quantity of each type of silicon species in the resin solution and monitoring its change over time. Samples for $Si^{29}$ NMR analysis are prepared by mixing 3.0 mL of a 20-25% solids hardcoat resin solution with 2.0 mL of a solution of 0.7% (wt/vol) chromium (III) acetyl-acetonate in deuterated acetone. Samples are then analyzed in a Bruker DPX-400 NMR system equipped with a Si-29 background free probe with H-1 decoupling capability. A 200 ppm sweep width is used at a carrier frequency at −50 ppm. Raw data is acquired using the "zgig" pulse program, waltz-16 gated $H^1$ decoupling, and a relaxation delay of 5 seconds. A total of 3600 scans are typically acquired in order to give data with a good signal to noise ratio. The integration of the resonances corresponding to $T^3$ and $T^2$ are then used to calculate the $T^3:T^2$ ratio. The change in the $T^3:T^2$ ratio over time is a function of many factors such as resin composition, resin molecular weight, pH, concentration, temperature, etc. The increase in the $T^3:T^2$ ratio over time correlates with an increase in resin molecular weight and solution viscosity.

According to one embodiment of the invention, the $T^3:T^2$ ratio of the aqueous/organic solvent silicone dispersion, i.e., component (a) of the present invention is from about 0.4 to about 1.3. According to another embodiment of the invention, the $T^3:T^2$ ratio of the aqueous/organic solvent silicone dispersion is from about 0.8 to about 1.2, and in yet another specific embodiment the $T^3:T^2$ ratio is from about 0.85 to about 1.15.

According to one embodiment of the invention, the aqueous/organic solvent silicone dispersion of colloidal silica and partial condensate is prepared by initially mixing a trialkoxysilane, e.g., methyltrimethoxysilane and acetic acid, and thereafter adding the colloidal silica, e.g., Ludox, AS-40, along with deionized water. The resulting mixture is aged, and optionally agitated, for about 16 hours or more until its $T^3:T^2$ ratio is from about 0.4 to about 1.3. The aging occurs under ambient conditions during which time a suitable alcohol, such as, isopropanol, butanol or mixture thereof can be added. Optionally, slightly elevated temperature from about 25° to about 65° C. can be used after the initial 16 hour period to accelerate the aging process to obtain the necessary $T^3:T^2$ ratio.

Alternatively, the aqueous/organic solvent silicone dispersions of the present invention can be prepared by adding a trialkoxysilane, e.g., methyltrimethoxysilane, to a commercially available aqueous dispersion of colloidal silica. Examples of commercially available aqueous dispersion of colloidal silica include, for example, Ludox HS 40 and Ludox TM 50 available from Grace-Davidson Co. and Nalco 1034A available from the Nalco Chemical Co. of Naperville, Ill., which have been treated with glacial acetic acid to adjust the pH. After the addition of the methyltrimethoxysilane, the resulting acidified dispersion is allowed to stand for about 1 hour until the pH is stabilized at about 4.5. The resulting compositions can be aged for several days to insure a $T^3:T^2$ ratio from about 0.4 to about 1.3 of the partial condensate of methyltrimethoxysilane and the silica methanol-water dispersion.

Additional sources of a colloidal silica dispersion of the present invention can be prepared by the methods described in p 312-461, "The Chemistry of Silica", Ralph K. Iler, John Wiley & Sons, (1979), pg. 312-461 (ISBN 0-471-02404-X).

According to an embodiment of the invention, the organoalkoxysilane(s) used in the aqueous/organic solvent silicone dispersion of the present invention include organotrialkoxysilanes of the general Formula (1):

$$(R^9)Si(OR^{10})_3 \qquad (1)$$

wherein $R^9$ is a monovalent hydrocarbyl group containing 1 to 6 carbon atoms, and optionally includes at least one heteroatom selected from the group consisting of oxygen and fluorine, and preferably $R^9$ is a 1 to 4 carbon alkyl, a vinyl ($—CH=CH_2$), an allyl ($—CH_2CH=CH_2$), or an aromatic group, e.g., phenyl; and each occurrence of $R^{10}$ is independently a monovalent hydrocarbyl group containing 1 to 6 carbon atoms, a hydrogen, a formyl ($—C(=O)H$), or an acetyl ($—C(=O)CH_3$) group.

Useful organotrialkoxysilanes which can form a partial condensate include, but are not limited to 3,3,3-trifluoropropyltrimethoxysilane, methyltrimethoxysilane, methyltrihydroxysilane, ethyltrimethoxysilane, methyltriacetoxysilane, ethyltriethoxysilane, methyltriethoxysilane, phenyltrialkoxysilane (e.g., phenyltriethoxysilane and phenyltrimethoxysilane), and mixtures thereof and the like. According to one specific embodiment of the invention, the organotrialkoxysilane used to prepare the aqueous/organic solvent silicone dispersion of the present invention is methyltrimethoxysilane or methyltrihydroxysilane, or a mixture thereof.

Additional organoalkoxysilanes can be added to the aqueous/organic solvent silicone dispersion to provide partial condensates. Other suitable organoalkoxysilanes include those of the general Formula (2):

$$(R^{11})_2Si(OR^{12})_2 \qquad (2)$$

wherein each occurrence of $R^{11}$ is independently a monovalent hydrocarbyl group containing 1 to 6 carbon atoms, and optionally includes at least one heteroatom selected from the group consisting of oxygen and fluorine, and preferably $R^{11}$ is a 1 to 4 carbon alkyl, a vinyl ($—CH=CH_2$), an allyl ($—CH_2CH=CH_2$), or an aromatic group, e.g., phenyl; and each occurrence of $R^{12}$ is independently a monovalent hydrocarbyl group containing 1 to 6 carbon atoms, a hydrogen, a formyl ($—C(=O)H$), or an acetyl ($—C(=O)CH_3$) group.

Useful diorganodialkoxysilane include, but are not limited to 3,3,3-trifluoropropylmethyldimethoxysilane, dimethyldimethoxysilane, dimethyldihydroxysilane, diethyldimethoxysilane, dimethyldiacetoxysilane, diethyldiethoxysilane, dimethyldiethoxysilane, and methylphenyldimethoxysilane mixtures thereof and the like. According to one specific embodiment of the invention, the diorganodialkoxysilane used to prepare the aqueous/organic solvent silicone dispersion of the present invention is dimethyldimethoxysilane or dimethyldihydroxysilane, or a mixture thereof.

The silylating agents useful in the preparation of the heat curable silicone hardcoat compositions of the present invention, i.e., component (b), are monofunctional silylating agents and includes those of the general Formula (3):

$$(R^1)_3Si(X) \tag{3}$$

wherein each occurrence of $R^1$ is independently a monovalent hydrocarbyl group containing from 1 to about 6 carbon atoms, and optionally includes at least one heteroatom selected from the group consisting of oxygen and fluorine, and preferably $R^1$ is a 1 to 4 carbon alkyl, a vinyl ($-CH=CH_2$), an allyl ($-CH_2CH=CH_2$), or an aromatic group; and X is a halogen (e.g., $-Cl$, $-Br$, $-I$); an alkoxy ($-OR^2$), wherein each $R^2$ is a monovalent hydrocarbyl group containing from 1 to about 6 carbon atoms, and optionally includes at least one heteroatom selected from the group consisting of oxygen and fluorine; a hydroxy ($-OH$); a carboxylate ($-OC(=O)R^3$), wherein $R^3$ is a hydrogen or a monovalent hydrocarbyl group containing 1 to 6 carbon atoms, and optionally includes at least one heteroatom selected from the group consisting of oxygen and fluorine; a sulfonate ($-OSO_2R^4$), wherein $R^4$ is a monovalent hydrocarbyl containing 1 to 6 carbon atoms, and optionally includes at least one heteroatom selected from the group consisting of oxygen and fluorine; an acetamido ($-NR^5C(=O)R^6$), wherein $R^5$ and $R^6$ are a hydrogen or a monovalent hydrocarbyl containing 1 to 6 carbon atoms, and optionally includes at least one heteroatom selected from the group consisting of oxygen and fluorine; an amino ($-NR^7_2$), wherein each $R^7$ is independently a hydrogen or a monovalent hydrocarbon radical containing 1 to 6 carbon atoms, and optionally includes at least one heteroatom selected from the group consisting of oxygen and fluorine; or a silazane ($-NR^8SiR^1_3$), wherein each occurrence of $R^1$ is independently a monovalent hydrocarbyl group containing from 1 to about 6 carbon atoms, and optionally includes at least one heteroatom selected from the group consisting of oxygen and fluorine, and preferably each occurrence of $R^1$ is independently a 1 to 4 carbon alkyl, a vinyl ($-CH=CH_2$), an allyl ($-CH_2CH=CH_2$), or an aromatic group, and $R^8$ is a hydrogen or a monovalent hydrocarbyl group containing 1 to 6 carbon atoms, and optionally includes at least one heteroatom selected from the group consisting of oxygen and fluorine.

Useful monofunctional silylating agents of the present invention include, but are not limited to trimethylchlorosilane, triethylchlorosilane, phenyldimethylchlorosilane, trimethylacetoxysilane, N-(t-butyldimethylsilyl)-N-methyltrifluoroacetamide, t-butyldimethylsilyltrifluoromethanesulfonate, n-butyldimethyl(dimethylamino)silane, hexamethyldisilazane (HMDZ), divinyltetramethyldisilazane, 3,3,3-trifluoropropyldimethylmethoxysilane, trimethylmethoxysilane, trimethylhydroxysilane, triethylmethoxysilane, 3,3,3-trifluoropropyldimethylacetoxysilane, and triethylethoxysilane.

According to one specific embodiment of the invention, hexamethyldisilazane is the silylating agent used to provide the thermal cure silicone hardcoat composition.

Additional silylating agents can be used in the preparation of the heat curable silicone hardcoat compositions of the present invention and include diorganodialkoxysilanes, as described herein above, and organotrialkoxysilanes of the general Formula (4):

$$(R^{13})Si(OR^{12})_3 \tag{4}$$

wherein $R^{13}$ is a monovalent hydrocarbyl group containing 2 to about 6 carbon atoms, and optionally includes at least one heteroatom selected from the group consisting of oxygen and fluorine, with the proviso that $R^{13}$ is not the same as $R^{11}$; and each occurrence of $R^{12}$ is independently a monovalent hydrocarbyl group containing 1 to 6 carbon atoms, a hydrogen, a formyl ($-C(=O)H$), or an acetyl ($-C(=O)CH_3$) group.

Useful organotrialkoxysilanes silylating agents include, but are not limited to 3,3,3-trifluoropropyltrimethoxysilane, hexyltrimethoxysilane, phenyltrialkoxysilane (e.g., phenyltriethoxysilane and phenyltrimethoxysilane), and mixtures thereof and the like.

According to one embodiment of the invention, the heat curable silicone hardcoat composition comprises:

a) an aqueous/organic solvent silicone dispersion containing colloidal silica and a partial condensate of at least one organoalkoxysilane said dispersion possessing a $T^3:T^2$ ratio from about 0.4 to about 1.3; and b) at least one monofunctional silylating agent, wherein the monovalent silylating agent is described by general Formula (3)

$$(R^1)_3Si(X) \tag{3}$$

wherein each occurrence of $R^1$ is independently a monovalent hydrocarbyl group containing from 1 to about 6 carbon atoms, and optionally includes at least one heteroatom selected from the group consisting of oxygen and fluorine, and preferably $R^1$ is a 1 to 4 carbon alkyl, a vinyl ($-CH=CH_2$), an allyl ($-CH_2CH=CH_2$), or an aromatic group; and X is a halogen (e.g., $-Cl$, $-Br$, $-I$); an alkoxy ($-OR^2$), wherein $R^2$ is a monovalent hydrocarbon radical containing from 1 to about 6 carbon atoms, and optionally includes at least one heteroatom selected from the group consisting of oxygen and fluorine; a hydroxy ($-OH$); a carboxylate ($-OC(=O)R^3$), wherein $R^3$ is a hydrogen or a monovalent hydrocarbyl group containing 1 to 6 carbon atoms, and optionally includes at least one heteroatom selected from the group consisting of oxygen and fluorine; a sulfonate ($-OSO_2R^4$), wherein $R^4$ is a monovalent hydrocarbon radical containing 1 to 6 carbon atoms, and optionally includes at least one heteroatom selected from the group consisting of oxygen and fluorine; an acetamido ($-NR^5C(=O)R^6$), wherein $R^5$ and $R^6$ are a hydrogen or a monovalent hydrocarbon radical containing 1 to 6 carbon atoms, and optionally includes at least one heteroatom selected from the group consisting of oxygen and fluorine; an amino ($-NR^7_2$), wherein $R^7$ is a hydrogen or a monovalent hydrocarbon radical containing 1 to 6 carbon atoms, and optionally includes at least one heteroatom selected from the group consisting of oxygen and fluorine; or a silazane ($-NR^8SiR^1_3$), wherein each occurrence of $R^1$ is independently a monovalent hydrocarbyl group containing from 1 to about 6 carbon atoms, and optionally includes at least one heteroatom selected from the group consisting of oxygen and fluorine, and preferably each occurrence of $R^1$ is independently a 1 to 4 carbon alkyl, a vinyl (—CH=CH$_2$), an allyl (—CH$_2$CH=CH$_2$), or an aromatic group, and $R^8$ is a hydrogen or a monovalent hydrocarbyl group containing 1 to 6 carbon atoms, and optionally includes at least one heteroatom selected from the group consisting of oxygen and fluorine.

Particularly useful monofunctional silylating agents are selected from the group consisting of N-(t-butyldimethylsilyl)-N-methyltrifluoroacetamide, N-(trimethylsilyl)-N-methyltrifluoroacetamide, hexamethyldisilazane and divinyltetramethyldisilazane.

The inventive composition provides for the reaction of an aqueous/organic solvent silicone dispersion containing colloidal silica and a partial condensate of at least one organoalkoxysilane, e.g., AS4010 (which is a partial condensate of methyltrimethoxysilane, colloidal silica, and silylated dibenzoresorcinol with isopropanol and n-butanol as co-solvents, available from Momentive Performance Materials), with at least one silylating agent, e.g., hexamethyldisilazane (HMDZ), which results in a modified thermally curable silicone resin, that when coated and cured on a polymeric substrate, e.g., PC or PET, has improved crack resistance and adhesion when flexed.

According to one embodiment of the invention, the aqueous/organic solvent silicone dispersion, component (a), is present in an amount that ranges from about 85 to about 99.9 weight percent and the silylating agent, component (b), is present in an amount that ranges from about 0.1 to about 15 weight percent of the heat curable silicone hardcoat composition. According to another embodiment, component (a), is present in an amount that ranges from about 95 to about 99 weight percent and, component (b), is present in an amount that ranges from about 1 to about 5 weight percent of the heat curable silicone hardcoat composition. According to still another embodiment, component (a), is present in an amount that ranges from about 98 to about 99 weight percent and, component (b), is present in an amount that ranges from about 1 to about 2 weight percent of the heat curable silicone hardcoat composition.

In one embodiment of the invention, the present invention includes a process for making a heat curable silicone hardcoat compositions which comprises: (a) preparing an aqueous/organic solvent silicone dispersion containing colloidal silica and a partial condensate of at least one organoalkoxysilane, wherein the dispersion possesses a $T^3:T^2$ ratio from about 0.4 to about 1.3; (b) adding at least one silylating agent; and, optionally, (c) cooling the aqueous/organic solvent silicone dispersion prior to adding the silylating agent to provide a heat curable silicone hardcoat composition.

According to another embodiment, the invention provides a process for making heat curable silicone hardcoat compositions which comprises:

(a) preparing an aqueous/organic solvent silicone dispersion containing colloidal silica and a partial condensate of at least one organoalkoxysilane, wherein the dispersion possesses a $T^3:T^2$ ratio from about 0.4 to about 1.3;

(b) adding at least one monofunctional silylating agent; and, optionally, (c) cooling the aqueous/organic solvent silicone dispersion prior to adding the silylating agent to provide a heat curable silicone hardcoat composition, wherein the monofunctional silylating agent is described by general Formula (3):

$$(R^1)_3Si(X) \qquad (3)$$

wherein each occurrence of $R^1$ is independently a monovalent hydrocarbyl group containing from 1 to about 6 carbon atoms, and optionally includes at least one heteroatom selected from the group consisting of oxygen and fluorine, and preferably $R^1$ is a 1 to 4 carbon alkyl, a vinyl (—CH=CH$_2$), an allyl (—CH$_2$CH=CH$_2$), or an aromatic group; and X is a halogen (e.g., —Cl, —Br, —I); an alkoxy (—OR$^2$), wherein $R^2$ is a monovalent hydrocarbyl group containing from 1 to about 6 carbon atoms, and optionally includes at least one heteroatom selected from the group consisting of oxygen and fluorine; a hydroxy (—OH); a carboxylate (—OC(=O)R$^3$), wherein $R^3$ is a hydrogen or a monovalent hydrocarbyl group containing 1 to 6 carbon atoms, and optionally includes at least one heteroatom selected from the group consisting of oxygen and fluorine; a sulfonate (—OSO$_2$R$^4$), wherein $R^4$ is a monovalent hydrocarbyl containing 1 to 6 carbon atoms, and optionally includes at least one heteroatom selected from the group consisting of oxygen and fluorine; an acetamido (—NR$^5$C(=O)R$^6$), wherein $R^5$ and $R^6$ are a hydrogen or a monovalent hydrocarbyl containing 1 to 6 carbon atoms, and optionally includes at least one heteroatom selected from the group consisting of oxygen and fluorine; an amino (—NR$^7_2$), wherein $R^7$ is a hydrogen or a monovalent hydrocarbon radical containing 1 to 6 carbon atoms, and optionally includes at least one heteroatom selected from the group consisting of oxygen and fluorine; or a silazane (—NR$^8$SiR$^1_3$), wherein each occurrence of $R^1$ is independently a monovalent hydrocarbyl group containing from 1 to about 6 carbon atoms, and optionally includes at least one heteroatom selected from the group consisting of oxygen and fluorine, and preferably each occurrence of $R^1$ is independently a 1 to 4 carbon alkyl, a vinyl (—CH=CH$_2$), an allyl (—CH$_2$CH=CH$_2$), or an aromatic group, and each $R^8$ is a hydrogen or a monovalent hydrocarbyl group containing 1 to 6 carbon atoms, and optionally includes at least one heteroatom selected from the group consisting of oxygen and fluorine.

Cooling the dispersion resulting from step (a) is necessary when the silylating agent(s) is highly reactive. For example, cooling is required when HMDZ is used as the silylating agent because of the rapid hydrolysis of HMDZ. In the case of silylating agents that are less hydrolytically sensitive, cooling may not be required.

Accelerated curing of the silicone hardcoat compositions of the present invention can be performed with various catalysts. Suitable catalysts include carboxylate salts such as sodium acetate, potassium acetate, and tetra-n-butylammonium acetate, see e.g., U.S. Pat. Nos. 4,863,520 and 4,348,431, and fluoride salts such as tetraethylammonium fluoride and tetrabutylammonium fluoride, see e.g., EP 0576166A2. The content of the forgoing patents are herein incorporated by reference.

Typical adhesion promoter suitable for addition to the heat curable silicone hardcoat composition of the invention include acrylic polyols, acrylate esters, polyester polyols, and the like as described in U.S. Pat. Nos. 5,503,935; 5,411,807 and 5,349,002, the contents of which are incorporated herein by reference.

UV absorbers can be employed at levels from about 2 to about 20 weight percent of the total composition. Suitable UV absorbers are those which co-react with partial hydolyzate and are less likely to volatalize during the heat cure. Exemplary UV absorbers include 4-[gamma-(trimethoxysilyl)propoxy]-2-hydroxybenzophenone, 4-[gamma-(triethoxysilyl) propoxy]-2-hydroxybenzophenone, hydroxybenzophenone and benzotriazole serves as well as the triazine, cyanoacrylates and benzylidene malonates or their mixtures. According to another embodiment of the invention the UV absorber useful in preparing the heat curable silicone hardcoat composition is 2-[(triethoxysilyl)propyl]dibenzylresorcinol.

Other additives such as hindered amine light stabilizers, antioxidants, dye, flow modifiers and leveling agents or surface lubricants can be used. Other colloidal metal oxides can be present at up to about 10% by weight of the aqueous/organic solvent dispersion with colloidal silica and include metal oxides such as, antimony oxide, cerium oxide, aluminum oxide, zinc oxide, and titanium dioxide.

The resulting silicone hardcoat compositions can be applied to primed or unprimed polymeric substrates to produce composites upon cure of the silicone hardcoat composition exhibiting improved weatherability, flexibility and thermoformability. Suitable substrates include, for example, plastics (polycarbonate, polymethylmethacrylate, polyester, epoxy resins, melamine resins, polyurethane resins, polyimides, polyetherimides, polysulfones, etc.), metals, wood, paper, glass, ceramics, and slates. The silicone hardcoat composition are particularly well suited for use on aromatic thermoplastic substrates, such as, Lexan (R) polycarbonate of the General Electric Company and polyethyleneterephthalate which is available from various manufacturers.

The coating composition can be applied onto the substrate by the well known methods such as spraying, dipping, roll coating and the like. It can be cured thermally at temperatures specifically ranging from about 70° C. to about 150° C., more specifically from about 80° C. to about 140° C. and most specifically at about 130° C. for specifically from about 1 to about 120 minutes and more specifically from about 10 to about 90 minutes, or by the use of infrared or microwave energy.

Articles and/or composites made in accordance with the present invention can be used in applications, such as automotive headlamps, automotive body panels and decorative trim, plastic architectural glazing, protective films for automotive, architectural glass installations and the like.

In order that those skilled in the art will be better able to practice the present invention, the following examples are given by way of illustration and not by way of limitation. All parts are by weight.

Examples 1 and 2 and Comparative Examples 1 and 2 were prepared as follows: Each example was prepared with 100 g of AS4010 solution (a partial condensate of methyltrimethoxysilane, colloidal silica, and silylated dibenzoresorcinol with isopropanol and n-butanol) that was cooled to less than 20° C. To the cooled solutions (i.e., AS4010) was added 1.0 g of the silylating agent as presented Table 1 (i.e., hexamethyldisilazane (HMDZ), phenyltriethoxysilane (PhSi(OEt)$_3$), in Examples 1 and 2, respectively, and no silylating agent and 1.0 g of tetraethyl orthosilicate (TEOS), Comparative Example 1 and 2, respectively). After mixing for approximately 1 hour the examples were allowed to stand at room temperature for approximately 3 days. Examples 1-2 and Comparative Examples 1-2 were then applied by flowcoating to 0.003" thick PET film coated with an acrylic primer (available from Madico, Inc., Woburn, Mass.). The coated samples were then allowed to stand for approximately 20 minutes at 20° C. and 40% relative humidity, to flash off the volatile solvents, and then cured at 90° C. for 2.0 hours.

After cooling the crack resistance of the Examples 1-2 and Comparative Examples 1-2 were tested. 1"×4" strips of coated PET film were gently folded into teardrop shaped loops, coating side out, then pulled through a gap of known dimension (pinch gap). The pinch gap was decreased until the coating was observed to crack. The pinch gap, film thickness, and coating thickness were then used to calculate the percent strain at which the coating cracked (a.k.a "critical strain"). Critical strain results are presented in Table 2.

TABLE 1

Formulations

|  | silylating agent | AS4010 charge | Additive charge |
|---|---|---|---|
| Comparative Example 1 | — | 100.0 | 0.0 |
| Example 1 | HMDZ | 100.0 | 1.0 |
| Example 2 | PhSi(OEt)$_3$ | 100.0 | 1.0 |
| Comparative Example 2 | TEOS* | 100.0 | 1.0 |

*TEOS is a tetrafunctional silane which increases the crosslink density. It is provided as an example to illustrate the effect of crosslink density on flexibility and cracking resistance.

TABLE 2

Critical Strain to Crack for Silicone Hardcoat Formulations.

|  | silylating agent | Critical Strain | Additive charge |
|---|---|---|---|
| Comparative Example 1 | — | 1.9% | 0.0 |
| Example 1 | HMDZ | 3.3% | 1.0 |
| Example 2 | PhSi(OEt)$_3$ | 2.3% | 1.0 |
| Comparative Example 2 | TEOS | 2.0% | 1.0 |

Examples 3-7 and Comparative Examples 3-9 were prepared and applied to PET film as described above with AS4010 silicone hardcoat solution possessing various $T^3:T^2$ ratios as displayed in Table 3. The coating solutions of Examples 3-7 and Comparative Examples 3-9 were also applied by flowcoating to 0.125" thick polycarbonate panels precoated with an acrylic primer. The coated polycarbonate samples were then allowed to stand for approximately 20 minutes at 20° C. and 40% relative humidity to flash off the volatile solvents and cured at 125° C. for 1 hour. After cooling the panels, abrasion resistance of the coating samples were measured using ASTM D1003/D1044 (Taber Abrasion). The PET coated Examples 3-7 and Comparative Examples 3-9 were subjected to critical strain analysis and the PC coated Examples 3-7 and Comparative Examples 3-9 underwent Taber abrasion studies. The results are presented in Table 4.

TABLE 3

Various AS4010 Coating Solutions Modified with HMDZ ($T^3:T^2$ ratio measurements were made prior to addition of HMDZ).

|  | Age Time @ 35° C. (days) | AS4010 $T^3:T^2$ | AS4010 Charge (g) | HMDZ Charge (g) | HMDZ % |
|---|---|---|---|---|---|
| Comparative Example 3 | 7.5 | 0.87 | — | — | 0.0% |
| Example 3 | 8 | 0.88 | 3200 | 32 | 1.0% |
| Example 4 | 8 | 0.88 | 3200 | 64 | 2.0% |
| Comparative Example 4 | 16.5 | 1.13 | — | — | 0.0% |
| Comparative Example 5 | 17 | 1.14 | — | — | 0.0% |
| Example 5 | 17 | 1.14 | 250 | 1.25 | 0.5% |
| Example 6 | 17 | 1.14 | 250 | 2.5 | 1.0% |
| Example 7 | 17 | 1.14 | 250 | 5 | 2.0% |
| Comparative Example 6 | 27 | 1.33 | — | — | 0.0% |

TABLE 3-continued

Various AS4010 Coating Solutions Modified with HMDZ ($T^3$:$T^2$ ratio measurements were made prior to addition of HMDZ).

| | Age Time @ 35° C. (days) | AS4010 $T^3$:$T^2$ | AS4010 Charge (g) | HMDZ Charge (g) | HMDZ % |
|---|---|---|---|---|---|
| Comparative Example 7 | 27 | 1.33 | 250 | 1.25 | 0.5% |
| Comparative Example 8 | 27 | 1.33 | 250 | 2.5 | 1.0% |
| Comparative Example 9 | 27 | 1.33 | 250 | 5 | 2.0% |

TABLE 4

Critical Strain to Crack and Taber Abrasion Resistance of HMDZ-modified AS4010.

| | Age Time @ 35° C. (days) | AS4010 $T^3$:$T^2$ | HMDZ % | Critical Strain | Taber ΔH 500 |
|---|---|---|---|---|---|
| Comparative Example 3 | 7.5 | 0.87 | 0.0% | 2.0% | 2.2% |
| Example 3 | 8 | 0.88 | 1.0% | 2.3% | 11.3% |
| Example 4 | 8 | 0.88 | 2.0% | 3.3% | 15.6% |
| Comparative Example 4 | 16.5 | 1.13 | 0.0% | 2.4% | 5.2% |
| Comparative Example 5 | 17 | 1.14 | 0.0% | 2.4% | 5.6% |
| Example 5 | 17 | 1.14 | 0.5% | 3.1% | 6.2% |
| Example 6 | 17 | 1.14 | 1.0% | 3.0% | 9.6% |
| Example 7 | 17 | 1.14 | 2.0% | 3.2% | 27.8% |
| Comparative Example 6 | 27 | 1.33 | 0.0% | 3.0% | 6.1% |
| Comparative Example 7 | 27 | 1.33 | 0.5% | 3.2% | 8.8% |
| Comparative Example 8 | 27 | 1.33 | 1.0% | 3.0% | 20.2% |
| Comparative Example 9 | 27 | 1.33 | 2.0% | 3.0% | 27.2% |

The data presented in Table 4 illustrates the effect of silane treatment of hardcoat resin on critical strain to crack. The data demonstrates that the addition of HMDZ to the AS4010 hard coat resin solutions applied to PET film improves critical strain while reducing the aging period (e.g., see Examples 3 and 4 and Comparative Example 5 and Example 6).

Comparative Example 10 was prepared as follows: To a 350 mL glass reaction vessel was charged 164.5 g of methyltrimethoxysilane and 4.0 g of acetic acid and agitation of the contents of the reaction vessel was started. The mixture was cooled for 10 minutes to a temperature of 20° C., after which 5.4 g of hexamethyldisilazane (HMDZ) was quickly added to the contents of the reaction vessel. Immediately after the addition of HMDZ a mild exotherm was observed and the reaction mixture temperature rose to approximately 25° C. In addition, the solution in the reactor became cloudy and a white crystalline solid formed on the walls of the reaction vessel and the mixture became cloudy. After 20 minutes the contents of the vessel had cooled back to approximately 20° C. and 2.0 g of acetic acid was added to the reaction mixture. A mixture of 101.6 g of Ludox AS40 colloidial silica and 30.4 g of deionized water was then added to the reaction vessel over a period of 15 minutes. Upon addition of the first few grams of the colloidal silica/water mixture the cloudiness and crystalline solids in the reactor disappeared (dissolved). Within 5 minutes of the start of the addition of the colloidal silica/water mixture an exotherm was observed that raised the temperature of the reaction mixture to approximately 24° C. The reaction mixture cooled back to 20° C. within 60 minutes and the mixture was allowed to continue to stir for approximately 20 hours. The contents of the reaction vessel were isolated to yield 295.0 g (95.8% yield) of reaction product. To the reaction product was added 86.6 g of n-butanol, 86.6 g of iso-propanol, 18.0 g of acetic acid and 48.41 g of a 32 wt % 2-(triethoxysilylpropyl)-4,6-dibenzylresorcinol in 1-methoxy-2-propanol. The sample was shaken well and allowed to stand until it had a $T^3$:$T^2$ of 0.90. A total of 534.6 g of coating solution was prepared.

Comparative Example 10 coating solution was then applied to PET film and Polycarbonate panels in the same manner described herein above. Data from critical strain testing (i.e., PET coated) and Taber abrasion testing (i.e., PC coated) are displayed in Table 5.

Comparative Example 11 was prepared as follows: To a 350 mL glass reaction vessel was charged 164.5 g of methyltrimethoxysilane and 4.0 g of acetic acid and agitation of the contents of the reaction vessel was started. The mixture was cooled for 10 minutes to a temperature of 20° C., after which 16.2 g of phenyltriethoxysilane was quickly added to the contents of the reaction vessel. A mixture of 101.6 g of Ludox AS40 colloidal silica and 30.4 g of deionized water was then added to the reaction vessel over a period of 15 minutes. Within 5 minutes of the start of the addition of the colloidal silica/water mixture an exotherm was observed that raised the temperature of the reaction mixture to approximately 24° C. The reaction mixture cooled back to 20° C. within 60 minutes and the mixture was allowed to continue to stir for approximately 20 hours. The contents of the reaction vessel were isolated to yield 298.3 g (94.2% yield) of reaction product. To the reaction product was added 88.5 g of n-butanol, 88.5 g of iso-propanol, 18.4 g of acetic acid and 48.3 g of a 32 wt % 2-(triethoxysilylpropyl)-4,6-dibenzylresorcinol in 1-methoxy-2-propanol. Comparative Example 8 was shaken well and allowed to stand until it had a $T^3$:$T^2$ of 0.75. A total of 542.0 g of Comparative Example 11 coating solution was prepared.

Comparative Example 11 coating solution was then applied to PET film and Polycarbonate panels in the same manner described herein above. Data from critical strain testing and Taber abrasion testing are displayed in Table 5.

Comparative Example 12 was prepared as follows: To a 350 mL glass reaction vessel was charged 164.6 g of methyltrimethoxy silane and 4.0 g of acetic acid and agitation of the contents of the reaction vessel was started. The mixture was cooled for 10 minutes to a temperature of 20° C. A mixture of 101.7 g of Ludox AS40 colloidal silica and 30.4 g of deionized water was then added to the reaction vessel over a period of 15 minutes. Within 5 minutes of the start of the addition of the colloidal silica/water mixture an exotherm was observed that raised the temperature of the reaction mixture to approximately 24° C. The reaction mixture cooled back to 20° C. within 60 minutes and the mixture was allowed to continue to stir for approximately 20 hours. The contents of the reaction vessel were isolated to yield 293.8 g (97.7% yield) of reaction product. To the reaction product was added 88.5 g of n-butanol, 88.5 g of iso-propanol, 18.4 g of acetic acid and 48.3 g of a 32 wt % 2-(triethoxysilylpropyl)-4,6-dibenzylresorcinol in 1-methoxy-2-propanol. Comparative Example 9 was shaken well and allowed to stand until it had a $T^3/T^2$ of 0.93. A total of 537.5 g of Comparative Example 12 coating solution was prepared.

Comparative Example 12 coating solution was then applied to PET film and Polycarbonate panels in the same manner described herein above. Data from critical strain testing and Taber abrasion studies are displayed in Table 5.

TABLE 5

Critical Strain to Crack and Taber Abrasion Resistance of
HMDZ- and Phenyltriethoxysilane-modified AS4010 Coatings
(Silanes added during initial resin synthesis reaction).

|  | Critical Strain | Taber ΔH 500 |
| --- | --- | --- |
| Comparative Example 10: (HMDZ) | 1.7% | 8.26% |
| Comparative Example 11: (PhSi) | 2.0% | 9.76% |
| Comparative Example 12: | 1.4% | 7.02% |

Comparison of the critical strain data from Table 2, (wherein the silylating agent was added to a pre-made resin solution, i.e., AS4010), and Table 5 (wherein the silylating agent was added to a mixture of silane monomers before the addition of the pre-made resin) illustrates that the timing of the addition of the silylating agent is critical to the invention. Example 1 and Comparative Example 10 have the same HMDZ content (1%), however, the addition of the HMDZ to the preformed resin solution in Example 1 results in significantly improved flexibility performance (critical strain 3.3%) in contrast to addition of the HMDZ to the resin monomer prior to resin formation (critical strain of only 1.7%).

Other embodiments of the invention will be apparent to those skilled in the art from a consideration of this specification or practice of the invention disclosed herein. It is intended that the specification and examples be considered as exemplary only, with the true scope and spirit of the invention being defined by the following claims.

The invention claimed is:

1. A heat curable silicone hardcoat composition comprising:
   a) an aqueous/organic solvent silicone dispersion containing colloidal silica and a partial condensate of at least one organoalkoxysilane said dispersion possessing a $T^3:T^2$ ratio from about 0.4 to about 1.3; and, added to said dispersion,
   b) at least one monofunctional silylating agent having the general formula:

$(R^1)_3Si(X)$ wherein,
   each occurrence of $R^1$ is independently a monovalent hydrocarbyl group containing from 1 to about 6 carbon atoms, and optionally includes at least one heteroatom selected from the group consisting of oxygen and fluorine; and
   X is a halogen; an alkoxy (—$OR^2$), wherein $R^2$ is a monovalent hydrocarbyl group containing from 1 to about 6 carbon atoms, and optionally includes at least one heteroatom selected from the group consisting of oxygen and fluorine; a hydroxy (—OH); a carboxylate (—OC(=O)$R^3$), wherein $R^3$ is a hydrogen or a monovalent hydrocarbyl group containing 1 to 6 carbon atoms, and optionally includes at least one heteroatom selected from the group consisting of oxygen and fluorine: a sulfonate (—$OSO_2R^4$), wherein $R^4$ is a monovalent hydrocarbyl containing 1 to 6 carbon atoms, and optionally includes at least one heteroatom selected from the group consisting of oxygen and fluorine; an acetamido (—$NR^5C(=O)R^6$), wherein $R^5$ and $R^6$ are a hydrogen or a monovalent hydrocarbyl containing 1 to 6 carbon atoms, and optionally includes at least one heteroatom selected from the group consisting of oxygen and fluorine; an amino (—$NR^7_2$), wherein $R^7$ is a hydrogen or a monovalent hydrocarbon radical containing 1 to 6 carbon atoms, and optionally includes at least one heteroatom selected from the group consisting of oxygen and fluorine; or a silazane —$NR^8SiR^1_3$), wherein each occurrence of $R^1$ is independently a monovalent hydrocarbyl group containing from 1 to about 6 carbon atoms, and optionally includes at least one heteroatom selected from the group consisting of oxygen and fluorine, and $R^8$ is a hydrogen or a monovalent hydrocarbyl group containing 1 to 6 carbon atoms, and optionally includes at least one heteroatom selected from the group consisting of oxygen and fluorine.

2. The composition of claim 1 wherein the organoalkoxysilane has the general formula:

$(R^9)Si(OR^{10})_3$ wherein,
   $R^9$ is a monovalent hydrocarbyl group containing 1 to 6 carbon atoms, and optionally includes at least one heteroatom selected from the group consisting of oxygen and fluorine; and,
   each occurrence of $R^{10}$ is independently a monovalent hydrocarbyl group containing 1 to 6 carbon atoms, a hydrogen, a formyl (—C(=O)H), or an acetyl (—C(=O)$CH_3$) group.

3. The composition of claim 1 wherein the organoalkoxysilane is at least one selected from the group consisting of 3,3,3-trifluoropropyltrimethoxysilane, methyltrimethoxysilane, methyltrihydroxysilane, ethyltrimethoxysilane, methyltriacetoxysilane, ethyltriethoxysilane, methyltriethoxysilane, phenyltriethoxysilane and phenyltrimethoxysilane.

4. The composition of claim 1 further comprising at least one additional organoalkoxysilane having the general formula:

$(R^{11})_2Si(OR^{12})_2$ wherein
   each occurrence of $R^{11}$ is independently a monovalent hydrocarbyl group containing 1 to 6 carbon atoms, and optionally includes at least one heteroatom selected from the group consisting of oxygen and fluorine; and,
   each occurrence of $R^{12}$ is independently a monovalent hydrocarbyl group containing 1 to 6 carbon atoms, a hydrogen, a formyl (—C(=O)H), or an acetyl (—C(=O)$CH_3$) group.

5. The composition of claim 4 wherein the organoalkoxysilane is at least one selected from the group consisting of 3,3,3-trifluoropropylmethyldimethoxysilane, dimethyldimethoxysilane, dimethyldihydroxysilane, diethyldimethoxysilane, dimethyldiacetoxysilane, diethyldiethoxysilane, dimethyldiethoxysilane and methylphenyldimethoxysilane.

6. The composition of claim 1 further comprising at least one additional silylating agent having the general formula:

$(R^{13})Si(OR^{12})_3$ wherein
   $R^{13}$ is a monovalent hydrocarbyl group containing 2 to about 6 carbon atoms, and optionally includes at least one heteroatom selected from the group consisting of oxygen and fluorine, with the proviso that $R^{13}$ is not the same as $R^{11}$; and,
   each occurrence of $R^{12}$ is independently a monovalent hydrocarbyl group containing 1 to 6 carbon atoms, a hydrogen, a formyl (—C(=O)H), or an acetyl (—C(=O)$CH_3$) group.

7. The composition of claim 1 wherein the silylating agent is at least one selected from the group consisting of trimethylchlorosilane, triethylchlorosilane, phenyldimethylchlorosilane, trimethylacetoxysilane, N-(t-butyldimethylsilyl)-N-methyltrifluoroacetamide, t-butyldimethylsilyltrifluoromethanesulfonate, n-butyldimethyl(dimethylamino)silane, hexamethyldisilazane, divinyltetramethyldisilazane, 3,3,3-trifluoropropyldimethylmethoxysilane, trimethylmethoxysilane, trimethylhydroxysilane, triethylmethoxysilane, 3,3,3-trifluoropropyldimethylacetoxysilane and triethylethoxysilane.

8. The composition of claim 1 wherein the organoalkoxysilane is at least one selected from the group consisting of methyltrimethoxysilane and methyltrihydroxysilane.

9. The composition of claim 1 wherein the silylating agent is hexamethyldisilazane.

10. The composition of claim 1 wherein the aqueous/organic solvent silicone dispersion has a $T^3:T^2$ ratio from about 0.8 to about 1.2.

11. The composition of claim 1 wherein the aqueous/organic solvent silicone dispersion has a $T^3:T^2$ ratio from about 0.85 to about 1.15.

12. The composition of claim 1 further comprising at least one additional component selected from the group consisting of UV absorbing material, hindered amine light stabilizers, other colloidal metal oxides, antioxidants, dye, flow modifiers, leveling agents and surface lubricants.

13. The composition of claim 1 wherein component (a) is present in an amount that ranges from about 85 to about 99.9 weight percent and component (b) is present in an amount that ranges from about 0.1 to about 15 weight percent of the total composition.

14. The composition of claim 1 wherein component (a) is present in an amount that ranges from about 95 to about 99 weight percent and component (b) is present in an amount that ranges from about 1 to about 5 weight percent of the total composition.

15. The composition of claim 1 wherein component (a) is present in an amount that ranges from about 98 to about 99 weight percent and component (b) is present in an amount that ranges from about 1 to about 2 weight percent of the total composition.

16. The cured silicone hardcoat composition of claim 1.

17. The cured silicone hardcoat composition of claim 16 possessing a critical strain of at least about 3.0 percent.

18. An article of which at least one component is the cured silicone hardcoat composition of claim 1.

19. A process for making a heat curable silicone hardcoat composition comprising:
  a) preparing an aqueous/organic solvent silicone dispersion containing colloidal silica and a partial condensate of at least one organoalkoxysilane, wherein the dispersion possesses a $T^3:T^2$ ratio from about 0.4 to about 1.3;
  b) adding to said dispersion at least one monofunctional silylating agent having the general formula:

$(R^1)_3Si(X)$ wherein,
    each occurrence of $R^1$ is independently a monovalent hydrocarbyl group containing from 1 to about 6 carbon atoms, and optionally includes at least one heteroatom selected from the group consisting of oxygen and fluorine; and,
    X is a halogen; an alkoxy (—OR$^2$), wherein R$^2$ is a monovalent hydrocarbyl group containing from 1 to about 6 carbon atoms, and optionally includes at least one heteroatom selected from the group consisting of oxygen and fluorine; a hydroxy (—OH); a carboxylate (—OC(=O)R$^3$), wherein R$^3$ is a hydrogen or a monovalent hydrocarbyl group containing 1 to 6 carbon atoms, and optionally includes at least one heteroatom selected from the group consisting of oxygen and fluorine; a sulfonate (—OSO$_2$R$^4$), wherein R$^4$ is a monovalent hydrocarbyl containing 1 to 6 carbon atoms, and optionally includes at least one heteroatom selected from the group consisting of oxygen and fluorine; an acetamido (—NR$^5$C(=O)R$^6$), wherein R$^5$ and R$^6$ are a hydrogen or a monovalent hydrocarbyl containing 1 to 6 carbon atoms, and optionally includes at least one heteroatom selected from the group consisting of oxygen and fluorine; an amino (—NR$^7{}_2$), wherein R$^7$ is a hydrogen or a monovalent hydrocarbon radical containing 1 to 6 carbon atoms, and optionally includes at least one heteroatom selected from the group consisting of oxygen and fluorine; or a silazane (—NR$^8$SiR$^1{}_3$), wherein each occurrence of R$^1$ is independently a monovalent hydrocarbyl group containing from 1 to about 6 carbon atoms, and optionally includes at least one heteroatom selected from the group consisting of oxygen and fluorine, and R$^8$ is a hydrogen or a monovalent hydrocarbyl group containing 1 to 6 carbon atoms, and optionally includes at least one heteroatom selected from the group consisting of oxygen and fluorine; and, optionally,
  c) cooling the aqueous/organic solvent silicone dispersion prior to adding the silylating agent to provide the heat curable silicone hardcoat composition.

20. A process for making a silicone hardcoat composition comprising curing the composition resulting from claim 19 with heat to obtain a cured silicone hardcoat.

21. The process of claim 19 wherein the organoalkoxysilane has the general formula:

$(R^9)Si(OR^{10})_3$ wherein, R$^9$ is a monovalent hydrocarbyl group containing 1 to 6 carbon atoms, and optionally includes at least one heteroatom selected from the group consisting of oxygen and fluorine; and, each occurrence of R$^{10}$ is independently a monovalent hydrocarbyl group containing 1 to 6 carbon atoms, a hydrogen, a formyl (—C(=O)H), or an acetyl (—C(=O)CH$_3$) group.

22. The process of claim 19 wherein the organoalkoxysilane is at least one selected from the group consisting of 3,3,3-trifluoropropyltrimethoxysilane, methyltrimethoxysilane, methyltrihydroxysilane, ethyltrimethoxysilane, methyltriacetoxysilane, ethyltriethoxysilane, methyltriethoxysilane, phenyltriethoxysilane and phenyltrimethoxysilane.

23. The process of claim 19 further comprising at least one additional organoalkoxysilane having the general formula:

$(R^{11})_2Si(OR^{12})_2$ wherein,
  each occurrence of R$^{11}$ is independently a monovalent hydrocarbyl group containing 1 to 6 carbon atoms, and optionally includes at least one heteroatom selected from the group consisting of oxygen and fluorine; and,
  each occurrence of R$^{12}$ is independently a monovalent hydrocarbyl group containing 1 to 6 carbon atoms, a hydrogen, a formyl (—C(=O)H), or an acetyl (—C(=O)CH$_3$) group.

24. The process of claim 23 wherein the organoalkoxysilane is at least one selected from the group consisting of 3,3,3-trifluoropropylmethyldimethoxysilane, dimethyldimethoxysilane, dimethyldihydroxysilane, diethyldimethoxysilane, dimethyldiacetoxysilane, diethyldiethoxysilane, dimethyldiethoxysilane and methylphenyldimethoxysilane.

25. The process of claim 19 further comprising at least one additional silylating agent having the general formula:

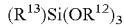

wherein $R^{13}$ is a monovalent hydrocarbyl group containing 2 to about 6 carbon atoms, and optionally includes at least one heteroatom selected from the group consisting of oxygen and fluorine, with the proviso that $R^{13}$ is not the same as $R^{11}$; and, each occurrence of $R^{12}$ is independently a monovalent hydrocarbyl group containing 1 to 6 carbon atoms, a hydrogen, a formyl (—C(═O)H), or an acetyl (—C(═O)CH$_3$) group.

26. The process of claim 19 wherein the silylating agent is at least one selected from the group consisting of trimethylchlorosilane, triethylchlorosilane, phenyldimethylchlorosilane, trimethylacetoxysilane, N-(t-butyldimethylsilyl)-N-methyltrifluoroacetamide, t-butyldimethylsilyltrifluoromethanesulfonate, -butyldimethyl(dimethylamino)silane, hexamethyldisilazane, divinyltetramethyldisilazane, 3,3,3-trifluoropropyldimethylmethoxysilane, trimethylmethoxysilane, trimethylhydroxysilane, triethylmethoxysilane, 3,3,3-trifluoropropyldimethylacetoxysilane and triethylethoxysilane.

27. The process of claim 19 wherein the organoalkoxysilane is at least one selected from the group consisting of methyltrimethoxysilane and methyltrihydroxysilane.

28. The process of claim 19 wherein the silylating agent is hexamethyldisilazane.

29. The process of claim 19 wherein the aqueous/organic solvent silicone dispersion has a $T^3:T^2$ ratio from about 0.8 to about 1.2.

30. The process of claim 19 wherein the aqueous/organic solvent silicone dispersion has a $T^3:T^2$ ratio from about 0.85 to about 1.15.

31. The process of claim 19 further comprising at least one additional component selected from the group consisting of UV absorbing material, hindered amine light stabilizers, other colloidal metal oxides, antioxidants, dye, flow modifiers, leveling agents and surface lubricants.

32. The process of claim 19 wherein component (a) is present in an amount that ranges from about 85 to about 99.9 weight percent and component (b) is present in an amount that ranges from about 0.1 to about 15 weight percent of the total composition.

33. The process of claim 19 wherein component (a) is present in an amount that ranges from about 95 to about 99 weight percent and component (b) is present in an amount that ranges from about 1 to about 5 weight percent of the total composition.

34. The process of claim 19 wherein component (a) is present in an amount that ranges from about 98 to about 99 weight percent and component (b) is present in an amount that ranges from about 1 to about 2 weight percent of the total composition.

35. The cured silicone hardcoat obtained from the process of claim 19.

36. The cured silicone hardcoat obtained from the process of claim 19 possessing a critical strain of at least about 3.0 percent.

37. An article of which at least one component is the cured silicone hardcoat obtained from the process of claim 19.

* * * * *